Aug. 18, 1942.  E. SCHLUETER  2,293,473
VOLUMETRIC FLUID FLOW INDICATOR
Filed June 8, 1939
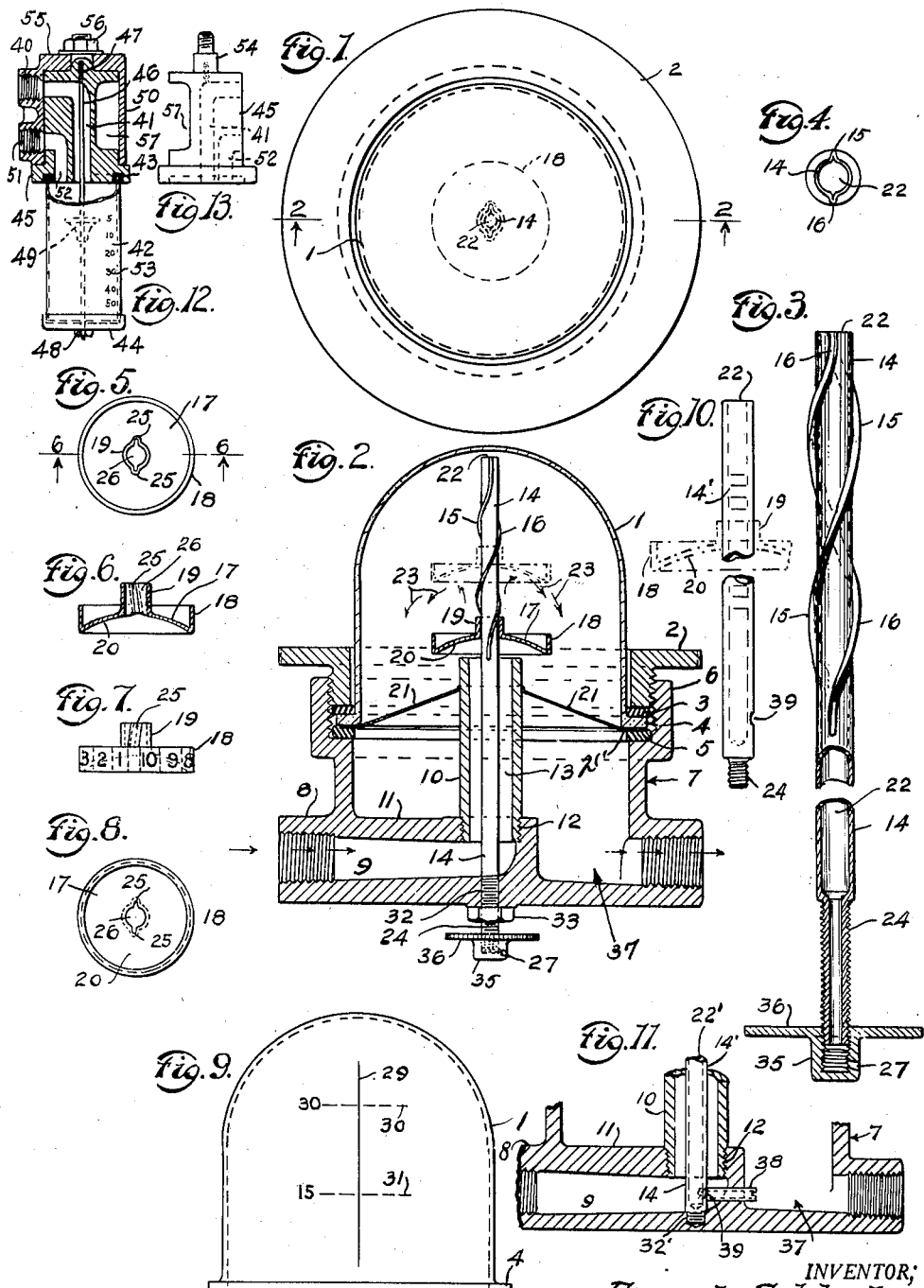
INVENTOR;
Ernest Schlueter;
BY
Harold D. Penney, ATTORNEY.

Patented Aug. 18, 1942

2,293,473

UNITED STATES PATENT OFFICE 2,293,473

VOLUMETRIC FLUID FLOW INDICATOR

Ernest Schlueter, Jamaica, N. Y.

Application June 8, 1939, Serial No. 278,007

31 Claims. (Cl. 73—194)

The present invention relates to a volumetric flow indicator for visually indicating the increase or decrease of fluid flow in pipe lines, and while not limited to such use, the present device is especially adapted for use in liquid fuel lines for caloric engines, oil burners, and the like.

The present device is particularly adapted for use in connection with airplane engines, as one instance of use, and the device may be mounted upon the instrument board of the airplane and connected in the fuel line between the airplane power unit and the fuel tank, and as thus mounted, the volumetric fluid flow of fuel may be observed, as will hereinafter be described in detail.

A double calibration or indicating index is one of the novel features of the herein device.

Another feature of advantage is in the provision of means whereby the increase or decrease of fluid flow, as related to a time period, is utilized to change the calibration reading, and thus indicate fluid flow.

Further features of advantage, and novelty of construction, will be apprehended as the herein description proceeds, and it will be obvious that modifications may be made in the structure herein without departing from the spirit hereof or the scope of the appended claims.

In the drawing,

Fig. 1 is a plan view of the device;

Fig. 2 is a sectional view, taken on line 2—2, Fig. 1, looking in the direction of the arrows;

Fig. 3 is an enlarged, partially sectioned view of the vent and volume gage actuating means;

Fig. 4 is a plan view of Fig. 3;

Fig. 5 is a plan view of Fig. 6;

Fig. 6 is a view in section of the fluid movable flow gage;

Fig. 7 is a side view of said gage;

Fig. 8 is a bottom view of the flow gage;

Fig. 9 is a view, in elevation, of the protective gage cup;

Fig. 10 is a fragmentary view in elevation of a modified form of vent and index tube;

Fig. 11 is a fragmented, lower end view of the vent tube of Fig. 10 applied to the base 7, of Fig. 2;

Fig. 12 is a view in elevation of a modified form of meter partially in section; and Fig. 13 is a view in elevation of the cut-off valve plug.

As disclosed in Fig. 2, the device comprises a transparent glass, dome shaped protector 1, having an integral flange 4 at its open bottom.

A metal base, generally denoted by 7, Fig. 2, is provided with an open, threaded circular rim 6, which receives therein a flanged and threaded clamp ring 2, whereby to hold said protector 1 in clamped position by its flange 4 between two resilient gaskets 3 and 5, in a fluid tight fit.

The lower portion of the base 7 is provided with a threaded blind inlet duct 9, at the inner terminus of which is threadedly attached, at 12, a vertical flow nozzle 10, which is open as at 13 and of constant internal diameter, from end to end.

The nozzle 10 extends part way into the protector 1, and is surrounded near its upper end by a cone shaped wire mesh screen 21, which has a perimetric flange 21' thereon, which is clamped under the flange 4 of the protector 1.

A vent tube 14 is threadedly attached to the lower wall of the duct 9, at 32, and extends upwardly through the nozzle 10, and terminates near the inside top of the protector 1 in an open end 22. The lower threaded end 24 of the vent tube 14 extends below the wall of duct 9, and a lock nut 33 is provided to lock said tube 14 in mounted position, as shown in Fig. 2.

The lower threaded end of the vent tube 14 is provided with a threadedly attached vent cap 35 which has a flange 36 for facilitating manual manipulation, to open and close the vent hole 27, shown open in Fig. 4. To close the hole 27, the cap 35 is screwed upwardly until the end of tube 14 bottoms in the cap. The purpose of this cap is to vent air or gas from the interior of the protector 1, when the instrument is started into operation, as will be described, more in detail, later.

The vent tube 14 has an additional function as will now be described. As shown in Figs. 2, 3 and 4, the vent tube is provided on its upper portion, which extends beyond the end of nozzle 10, with double threads 15 and 16, of like pitch, these threads being of such pitch and length as to form one complete turn on that section of the tube on which they are located. These threads may be cut on the tube, or as shown in Fig. 4, they may be made by crimping the wall of the tube.

The threads 15—16 are spaced apart equally, as seen in Fig. 4, and the purpose thereof is to loosely and movably engage in the threaded bore 26 of a light weight floatable and rotatable indicator gage, as shown in Figs. 2, 5, 6, 7 and 8. Said gage comprises a crowned disc portion 17, which is developed from the interiorly threaded hub portion 19, in which the vent tube engaging threaded recesses 25—25 are located, the disc portion having an indexed flange 18 at its perimeter. As shown in Fig. 2, in section, the indicator gage, which is freely mounted upon the vent tube 14, for a rising movement, rests, normally, near the bottom of the threads 15—16, and adjacent to the top of the flow or jet nozzle 10. As shown in Fig. 7, the flange 18 of the movable indicator gage is provided with index indices ranging from 1 to 10 for purposes later to be described.

The base 7 is provided with a threaded outlet duct 37, which is in communication with the inlet duct 9 through nozzle 10 and the screen 21, the fuel moving through ducts 9 and 37 in the direction of the associated arrows.

The transparent glass protector or dome 1, as shown in Fig. 9, is provided with a vertical index line 29, which is traversed horizontally by index lines 30 and 31. More or less horizontal index lines may be used, as desired, and in accord with the fuel consumption capacity of the engine, such capacities varying with different engines.

In use, with the present device connected between the fuel tank and the engine, upon starting the engine, the vent cap 35 is unscrewed, and any trapped air or gas vapor is vented out from the dome interior, by the rise of fuel into the dome by reason of suction action on the fuel, by the engine.

As the engine operates, fuel is drawn up through nozzle 10, and it impinges on the crowned underface 20 of the floatable index. This causes the index to rise and rotate on the threaded vent stem 14, to about the dotted position shown in Fig. 2. The rise of fuel in the chamber of dome 1, displaces vapors in the dome, and these are vented to atmosphere through vent hole 27.

The incoming fuel from nozzle 10 as it rises is deflected from the under face 20 of the index in the direction of the arrows 23, Fig. 2, and the floating index is thus raised and is rotated by the threads 15—16. As the engine rotates at given or controlled speeds, the volumetric flow of fluid fuel and the level thereof is substantially constant for any given engine speed, and therefore, when the engine is run at a constant speed the flow of fuel through the present device and its level will be constant, and the fuel flow will, at any speed lift the floating index, and constantly maintain it in such elevated position, higher or lower, in accord with engine speed, and consequent fuel consumption.

The indexes 30 and 31 shown on the protective dome 1, are for the purpose of indicating the consumption in gallons of fuel per hour, the lower mark indicating 15 gallons per hour, and the upper mark indicating 30 gallons fuel consumption per hour.

The floating index is provided with ten index numerals on its flange, as it rises on the vent tube 14, and it makes one complete revolution from its lower position of rest to the top of the vent tube, it will present numerals from 1 to 10, as it rises or falls under the influence of volumetric fuel flow. When the floating gage rises to the dotted position shown in Fig. 2 it would be about half way up the vent tube, and therefore be held between the index marks "15" and "30" and would therefore present the index numeral "5" relative to the vertical index line 29, Fig. 9, thus indicating that the fuel consumption is at the rate of "15" and "5," or twenty gallons per hour.

The fuel consumption may thus be checked with the speed indicator of the plane, either for air speed or ground speed, and by checking also with the fuel tank indicator, the aviator may be apprised of the distance he can travel with the residual fuel in the tank, under the flying conditions he is then encountering. These conditions vary, and thus will affect the showing of the instrument herein disclosed as such variations occur.

In operation, the gasoline passes through the screen 21, and out through the outlet duct 37, and when the screen becomes clogged, the dome 1, may be removed and the screen taken out, and cleaned and then replaced.

In some forms of the present device, the venting tube 14 may not be exteriorly threaded as shown in Figs. 10 and 11, but may be in the form of a plain tube, as in Fig. 10, upon which the floating index, also without threads, may rise and fall vertically on the index vent tube 14, to indicate volumetric flow. The venting tube 14 may be provided with a series of suitable flow index lines 14', Fig. 10, to indicate the vertical volume flow, during operation of the engine.

The lower end of the index tube 14, either as shown and constructed in Fig. 2, or Fig. 11, may be provided with a closed bottom, and a short, open ended nipple 38 tapped into the interior 22' of the vent tube 14' at 39, Fig. 11, and be discharged by suction into outlet port 37 of the base 7, and thus the trapped air or vapor in the upper portion of the protective dome 1, may be continuously and automatically vented into the discharge stream of fuel, as the device operates, and during rise and fall of the fuel in the device.

Otherwise the modification of Figs. 10 and 11 function exactly as the form shown in Figs. 1 to 9 inclusive.

In Figs. 12 and 13 is shown a modified form of meter for measuring volumetric liquid flow between the fuel supply tank and the engine, and will operate as described for the device in Fig. 2, the device of Fig. 12, however, is inverted and hangs downwardly and operates in this position.

In the operation of the device of Fig. 12 the fluid enters the inlet port 40 and from thence it passes downwardly through the central port 41 of constant internal diameter and the fluid fills the meter glass tube 42, the said tube being open at both ends and being seated against the soft groove mounted gasket 43 and is sealed at its other end by the gasketed cover 44.

The cover 44 and the tube 42 are held in operative relation to the valve plug 45 by means of a central holding rod 46, which is threadedly entered into the plug 45 at 47, the opposite end of said rod 46 being at its lower end provided with a threaded extension which passes through the cap 44 and receives thereon the threaded cap holding nut 48.

The upper section of the rod 46 passes upwardly through the port 41. The rod 46 has a double function in that it slidably mounts a volumetric flow indicating member 49 shown dotted, which may be made of cork or other buoyant material and which, as will be later described, floats in the interiorly contained fluid in the glass container 42.

The outer housing 50 besides containing the inlet port 40 also mounts the outlet port 51, the inner extension 52 of which opens up into the glass container 42.

The glass container 42 is provided at some suitable location upon its surface, with a row of visible index numerals generally denoted by 53. These numerals from 5 range downwardly to the numeral 50. These numerals indicate the number of gallons of fuel used per hour over a given period of time.

The operation of the foregoing noted modified device for indicating the volumetric flow of the liquid fuel passing through over a given time period is exactly as described in Fig. 2, with the exception that the fuel flows downwardly instead of upwardly in passing from the fuel supply tank to the inlet port 40 and out of the outlet port 51 to the engine.

In the operation of the device of Fig. 12, the fuel passes inwardly through port 40 to the glass chamber 42, whereupon the glass chamber is filled with liquid fuel, which then flows out through the port 51 to the engine. According to the impetus of the fuel entering the chamber from the port 41 the float 49 tends to be pushed downwardly into the liquid by the impact of the flow stream from port 41. The impetus or flow of the fuel against the float 49 tends to drive it further downwardly into the glass chamber 42 and the position of the flow is then read against the index numerals to which it has been driven. The greater the flow from port 41 gives indication of greater amount of fuel being demanded by the engine, the same as described for the device in Fig. 2.

In operation of the above device, the structure above the glass tube 42, may be made of any suitable material such as metal, and is made in two parts. The outer portion of the base comprises the outer shell 50 which includes the threaded ports 40 and 51 said shell 50 being rotatably fitted to the inner base or plug 45 for rotation thereon. The inner plug 45 is in the nature of a plug valve, and as shown in Fig. 12 is fitted in liquid tight rotation in the outer shell 50.

The plug 45, as shown in Fig. 13 is provided with a threaded stem 54, and at its upper end this end projects through the upper closed end 55 of the shell 50 and the washer and nut assembly 56 is mounted upon the threaded end of stem 54 thereby to hold the shell 50 and the plug 45 in liquid tight rotatable, valve like assembly. The plug is provided with an open chamber 57 which acts as a by-pass chamber so that in the event of breakage of the glass container 42 the plug 45 may be rotated one-half revolution in the shell 50, and thus bring the by-pass chamber 57 around to register with the inlet and outlet ports 40 and 51, respectively, and thus permit the fuel flow to the engine to be continued without interruption and thereby also prevent any extended waste of fuel and to permit the engine to continue running.

In the form of the invention of Fig. 12, the outlet port or duct 52 being at the upper part of the chamber carries off any bubbles that may collect in the chamber. The chamber wall 42 comprises a glass cylinder firmly mounted on the plug 45, and renders the float or member 49 visible from all sides, and also serves as a handle for rotating the plug.

In both forms of the invention as in Figs. 2 and 12 the indicator member 18 or 49 is normally biased toward the nozzle 13 or 41 with as much force when near the nozzle as when remote, and has a substantially circular impact face facing the nozzle and adapted to at times to cover the nozzle. The inner diameter of the nozzle is less than the diameter of the impact face and of the indicator member and much less than the diameter of the chamber; whereby when said face is remote from the nozzle the stream of fluid from the nozzle is much diverged from the chamber axis and its velocity lowered before it reaches said face, if the indicator member is remote from the nozzle, thus reducing the impact relative to speed of the stream on said face at the higher speeds.

In said devices of Figs. 2 and 12, the outlet duct 37 or 52 and nozzle 13 or 41 are both remote from the opposite closed end of the chamber, thereby causing the direction of the current of the fluid to be reversed at the closed end part of the chamber, thereby reducing almost to zero the moving force of fluid stream on the impact face of the indicator member 18 or 49 when remote from the nozzle. The nozzles 13 and 41 are preferably coaxial with their respective chambers.

Having thus described the invention, what is claimed is:

1. A volumetric fluid flow indicator comprising a base, a transparent housing located on said base, inlet and outlet ducts in said base and opening into said housing and means within said housing comprising a threaded support, a threaded floating index movably guided by the thread of said support and influenced by the fluid flow through said housing and indicating means on the index.

2. A volumetric fluid flow indicator comprising a base, inlet and outlet ducts in said base, a housing on said base, a vertical nozzle connected to said inlet duct being within said housing, a threaded floating index member mounted in said housing adjacent said nozzle and a threaded mounting mounted on said base within said housing whereby to mount said index for rising and rotative action.

3. A volumetric fluid flow indicator comprising a base, inlet and outlet ducts in said base, a housing on said base, a vertical jet nozzle connected to said inlet duct being within said housing to receive fluid from said inlet duct, a threaded floating index member mounted in said housing adjacent said nozzle in the path of said jet and a threaded vent tube mounted on said base within said nozzle whereby to mount said index for rising, falling and rotative action under the action of the jet of fluid from said nozzle.

4. A device as set forth in claim 2 in which the threaded mounting is also a vent tube, and means on said tube for opening and closing the vent.

5. A device as described in claim 3, in which the index member and the housing are provided with coordinating indexes.

6. A liquid-flow indicator comprising a base; an axially vertical substantially cylindrical chamber closed at one end and provided at the other with an outlet duct from the chamber, and a substantially straight and axially vertical interiorly cylindrical inlet nozzle of constant inner diameter coaxial with the chamber and discharging into the chamber remote from, and toward, the closed end; a straight guide rod stationarily mounted coaxially in the nozzle and chamber and extending substantially to said closed end; and an indicator member in the chamber slidably mounted on the rod coaxially therewith and normally biased toward the nozzle with as much force when near the nozzle as when remote and having a substantially circular impact face facing the nozzle and adapted to at times to cover the nozzle.

7. A liquid-flow indicator comprising an axially vertical substantially cylindrical chamber closed at the lower end and provided at the upper end with an outlet duct from the chamber, and with a nozzle discharging downwardly into the chamber; and an indicator member in the chamber lighter than the liquid mounted for movement coaxially of the nozzle axis and having an upper impact face adapted to yieldably close the nozzle when the nozzle and chamber are filled with liquid at rest; the inner diameter of the nozzle being less than the diameter of said face and much less than the diameter of the chamber.

8. A liquid-flow indicator comprising a base; a housing secured to the lower face of the base and cooperating therewith to provide an axially vertical substantially cylindrical chamber closed at the lower end; said base being provided with an outlet duct from the chamber, and with a nozzle of constant inner diameter coaxial with the chamber and discharging downwardly into the chamber; and an indicator member in the chamber lighter than the liquid and mounted for movement coaxially therewith and having a wide upper impact face adapted to yieldably close the nozzle when the nozzle and chamber are filled with liquid at rest; said duct being in the upper part of the chamber and carrying off bubbles that may collect in the chamber.

9. A liquid-flow indicator comprising a base; a transparent housing secured to the lower face of the base and cooperating therewith to provide an axially vertical substantially cylindrical chamber closed at the lower end; said base being provided with an outlet duct from the chamber, and with a substantially straight and axially vertical interiorly cylindrical inlet nozzle of constant inner diameter coaxial with the chamber and discharging downwardly into the chamber; and an indicator member in the chamber lighter than the liquid and mounted for movement coaxially therewith and exteriorly visible in all positions of its movement and having a wide upper impact face adapted to yieldably close the nozzle when the nozzle and chamber are filled with liquid at rest.

10. A liquid-flow indicator comprising a base; a transparent housing secured to the lower face of the base and cooperating therewith to provide an axially vertical substantially cylindrical chamber closed at the lower end; said base being provided with an outlet duct from the chamber, and with a substantially straight and axially vertical interiorly cylindrical inlet nozzle of constant inner diameter coaxial with the chamber and discharging downwardly into the chamber; a straight guide rod mounted coaxially of the nozzle and chamber and extending substantially to the lower end of the chamber; and an indicator member in the chamber lighter than the liquid and slidably mounted on the rod coaxially therewith and exteriorly visible in all positions of its movement and having a substantially circular upper impact face adapted to yieldably close the nozzle when the nozzle and chamber are filled with liquid at rest.

11. A fluid flow indicator comprising an elongated chamber substantially closed against flow of fluid from the interior of the chamber at one end, the other end being provided with an outlet duct and with a substantially straight nozzle substantially coaxial with the chamber and discharging into the chamber toward the closed end; and an indicator member guided in the chamber for substantially free movement from the nozzle coaxially of the chamber substantially to said closed end and normally biased toward the nozzle when the chamber is full of the fluid at rest, and having a wide impact face facing the nozzle; said outlet duct and nozzle both being remote from said closed end, thereby causing the direction of the current of the fluid to be reversed at the closed end part of the chamber thereby reducing almost to zero the moving force of fluid stream on the impact face when near said closed end, thereby increasing the range of the indicator at high speeds.

12. A fluid flow indicator comprising an elongated chamber provided at one end with an outlet duct and with a substantially straight nozzle substantially coaxial with the chamber and discharging into the chamber toward the other end; an elongated member mounted coaxially of the chamber and extending to near said other end and having an exterior thread thereon; an apertured interiorly threaded disk-shaped indicator member guided in the chamber and received on said thread for substantially free helical movement coaxially of the chamber and nozzle and normally biased toward the nozzle.

13. A fluid flow indicator comprising an elongated chamber provided at one end with an outlet duct and with a substantially straight nozzle substantially coaxial with the chamber and discharging into the chamber toward the other end; an elongated guide member mounted coaxially of the nozzle and extending to near said other end and having an exterior thread thereon; a disk-shaped indicator having a central interiorly threaded aperture loosely received on said guide member and thread for substantially helical movement coaxially of the chamber, said member being normally biased toward the nozzle, and having indicia on its periphery and a wide impact face facing the nozzle.

14. A fluid flow indicator comprising an elongated chamber provided at one end with an outlet duct and with a substantially straight nozzle substantially coaxial with the chamber and discharging into the chamber toward the other end; a vent tube mounted coaxially in the nozzle and having an open end near said other end and having an exterior thread thereon; an indicator member having an interiorly threaded aperture on said tube and thread for substantially free helical movement coaxially of the chamber remote from the nozzle and substantially to said other end and normally biased toward the nozzle; said tube at the nozzle end being provided with a vent to the exterior of the chamber.

15. In an indicator as in claim 14, said vent venting into said duct.

16. In an indicator as in claim 14, said vent venting into the exterior air.

17. In an indicator as in claim 14, a closure means for said vent.

18. A volumetric fluid flow indicator comprising an outer shell base in which are provided inlet and outlet ducts; a plug rotatable in the base and having a groove around its outer face and inlet and outlet ports in the plug surrounded by the groove and registerable with said ducts, the inlet port having a discharge portion coaxial with the plug; said plug having a by-pass port therein having its ends registerable, with said ducts whereby upon rotation of said plug the fuel fluid flow may be by-passed through the base directly without passing to said ports; a housing having a cylindrical glass wall mounted in said groove coaxial with the plug and discharge portion and enclosing the outlet port; and an impact member in the chamber influenced by the fluid flow from said discharge portion to indicate the rate of flow of the fluid.

19. A volumetric fluid flow indicator comprising an outer shell base in which are provided inlet and outlet ducts; a plug rotatable in the base and having inlet and outlet ports therein registerable with said ducts; said plug having a by-pass port therein having its ends registerable, with said ducts whereby upon rotation of said plug the fuel fluid flow may be by-passed through the base directly without passing through the ports; a housing having a cylindrical wall mounted on the plug coaxial with the plug and enclosing the ports; and an impact member freely movable in the chamber and influenced by the fluid flow from said inlet port to indicate the rate of flow of the fluid; said wall being firmly mounted on the plug and adapted to serve as a handle to rotate the plug.

20. A volumetric fluid flow indicator comprising an outer shell base in which are provided inlet and outlet ducts; a plug rotatable in the base and having inlet and outlet ports therein registerable with said ducts, the inlet port having a discharge portion coaxial with the plug; said plug having a by-pass port therein having its ends registerable, with said ducts whereby upon rotation of said plug the fuel fluid flow may be by-passed through the base directly without passing through the ports; a housing having a cylindrical glass wall mounted on the plug coaxial with the plug and discharge portion and enclosing the outlet port; a guide rod coaxial with the wall and discharge portion; and an impact member freely slidable on said rod in the fluid stream between said ports and influenced by the fluid flow from said discharge portion to indicate the rate of flow of the fluid.

21. A liquid-flow indicator comprising an axially vertical chamber closed at one end and provided at the other with an outlet duct from the chamber, and an axially vertical inlet nozzle discharging into the chamber remote from, and toward, the closed end; a straight guide rod stationarily mounted in the nozzle and chamber and extending substantially to said closed end; and an indicator member in the chamber slidably mounted on and relative to the rod and normally biased toward the nozzle and having an impact face facing the nozzle.

22. An indicator as in claim 21, said nozzle being such that the effective cross-sectional area thereof is at all times substantially constant.

23. An indicator as in claim 21, said member being normally biased to the nozzle when the chamber is full of the liquid at rest.

24. A liquid-flow indicator comprising an axially vertical chamber closed at one end and provided at the other with an outlet duct from the chamber, and an axially vertical inlet nozzle discharging into the chamber remote from, and toward, the closed end; a straight guide rod mounted in the chamber and extending substantially coaxially of and from the nozzle substantially to said closed end; and an indicator member in the chamber mounted on the rod for movement toward and from the nozzle and having an impact face facing the nozzle, and normally biased toward the nozzle when the chamber is full of the liquid at rest, and thereby movable to the nozzle when the chamber is full of liquid at rest.

25. An indicator as in claim 24, the effective cross-sectional area of the nozzle being at all times the same when the member is different distances away from the nozzle.

26. An indicator as in claim 24, said member being movable substantially to said closed end.

27. A liquid-flow indicator comprising a chamber nearly closed at one end and provided at the other with a large outlet duct from the chamber, and an inlet nozzle discharging into the chamber remote from, and toward, the nearly closed end; and an indicator member in the chamber movably guided for movement toward the nozzle and more remote from the nozzle than the middle of the chamber, on the extended axis of the nozzle, and having an impact face facing the nozzle, said member being normally movable and biased to the nozzle when the chamber is full of the liquid at rest.

28. An indicator as in claim 27, said nozzle being at all times of constant effective cross-section when the member is different distances remote from the nozzle.

29. An indicator as in claim 27, said member being movable substantially to said nearly closed end.

30. A liquid-flow indicator comprising an elongated chamber closed at one end and provided at the other with an outlet duct from the chamber, and an inlet nozzle discharging into the chamber remote from, and toward, the closed end; an indicator member in the chamber and means for guiding said member for movement remote from and toward the nozzle on the extended axis of the nozzle and having an impact face facing the nozzle, said member being normally movable and biased to the nozzle when the chamber is full of the liquid at rest, said closed end causing the liquid moving from the nozzle toward the closed end to reverse at a point near the closed end and then to move toward the nozzle; said guide means being constructed to guide the indicator member to said point, whereby decrease in velocity of the liquid as the member approaches said point causes progressively smaller changes in the position of the member, thereby permitting a small indicator to indicate a wide range of velocities.

31. A fluid flow indicator comprising an elongated chamber provided with an outlet duct and with a substantially straight nozzle discharging substantially coaxially into the chamber; a disk-shaped indicator member in the chamber; guide means for guiding said member substantially coaxially of the nozzle; said guide means being constructed to positively force the member to rotate whenever the member moves longitudinally and to maintain the member against rotation when the member does not move longitudinally, said member being normally biased toward the nozzle, and having a wide impact face facing the nozzle, said indicator member having on its periphery indicia corresponding to functions of the flow of liquid through the indicator.

ERNEST SCHLUETER.